(12) United States Patent
Käske (10) Patent No.: US 7,959,798 B2
(45) Date of Patent: Jun. 14, 2011

(54) DEVICE FOR TREATING A BACK-FLUSHED FLUID

(75) Inventor: Egon Käske, Aachen (DE)

(73) Assignee: Durr Ecoclean GmbH, Filderstadt (DE)

( * ) Notice: Subject to any disclaimer, the term of this patent is extended or adjusted under 35 U.S.C. 154(b) by 937 days.

(21) Appl. No.: 11/781,033

(22) Filed: Jul. 20, 2007

(65) Prior Publication Data
US 2008/0245711 A1 Oct. 9, 2008

(30) Foreign Application Priority Data

Apr. 5, 2007 (DE) .................... 20 2007 005 082 U (51) Int. Cl.
*B01D 21/02* (2006.01)
*B01D 36/04* (2006.01)
(52) U.S. Cl. .......... 210/86; 210/299; 210/316; 210/312; 210/410; 210/411; 210/535
(58) Field of Classification Search .................... 210/86, 210/316, 299, 303, 312, 534, 535, 410, 411
See application file for complete search history.

(56) References Cited

U.S. PATENT DOCUMENTS
5,346,629 A * 9/1994 Wuller .......................... 210/739

FOREIGN PATENT DOCUMENTS
DE 202006003680 7/2006
EP 1306118 A1 * 5/2003
WO WO 2004041438 A1 * 5/2004

OTHER PUBLICATIONS

English Translation of DE202006003680U1, dated Jan. 2011.*
Austrian Patent Office, Search Report issued for Austrian utility model application GM 347/2007, dated Jan. 16, 2008.

* cited by examiner

*Primary Examiner* — Terry K Cecil
(74) *Attorney, Agent, or Firm* — Hanley, Flight & Zimmerman, LLC.

(57) ABSTRACT

In order to provide a device for treating a fluid containing solids which has been flushed back from a reversible flow filter, comprising a sedimentation device for separating solids from the flushed back fluid by a process of sedimentation in a sediment collecting region which enables solids to be removed in a manner free from filter-aids and which exhibits as small a degree of fluid loss as possible, it is proposed that the sediment collecting region is arranged to be subjected to a positive pressure and/or a negative pressure in order to remove residual fluid from the sediment collecting region.

37 Claims, 8 Drawing Sheets

DEVICE FOR TREATING A BACK-FLUSHED FLUID

RELATED APPLICATION

The present disclosure relates to the subject matter disclosed in German utility model application No. 20 2007 005 082.8 of Apr. 5, 2007, which is incorporated herein by reference in its entirety for all purposes.

FIELD OF THE DISCLOSURE

The present invention relates to a device for treating a fluid containing solids which has been flushed back from a reversible flow filter, wherein the device comprises a sedimentation device for separating solids from the flushed back fluid by a process of sedimentation in a sediment collecting region.

BACKGROUND

Devices for treating flushed back fluid from a reversible flow filter wherein the quantity of back flushed fluid from the reversible flow filter is placed in a treatment bath or applied to a band filter system are known from the state of the art. Such treatment devices exhibit a high degree of fluid loss and/or require filter aids such as filter paper for example, for the purposes of removing the solids contained in the flushed back fluid.

SUMMARY OF THE INVENTION

The object of the present invention is to provide a device for treating flushed back fluid from a reversible flow filter of the type specified hereinabove which enables solids to be removed in a manner free from filter-aids and which exhibits as small a degree of fluid loss as possible.

In accordance with the invention, this object is achieved in that the sediment collecting region is arranged to be subjected to a positive pressure and/or a negative pressure in order to remove residual fluid from the sediment collecting region.

The device in accordance with the invention enables residual fluid to be removed from the sediment collecting region in a simple manner. For this purpose, it is sufficient to subject the sediment collecting region to a positive pressure and/or a negative pressure. The residual fluid removed from the sediment collecting region is then available again for renewed usage so that the device in accordance with the invention exhibits no or only a very low loss of fluid.

The removal of the residual fluid from the sediment collecting region is accompanied by a process of drying the solids that have deposited in the form of a sediment in the sediment collecting region. Following the removal of the residual fluid, the dried solids are present in cleansed form, i.e. substantially free of residual fluid. These cleansed solids can be disposed of or recycled in a particularly simple manner.

In accordance with one embodiment of the invention, the sedimentation device comprises a pressure applying means for subjecting the sediment collecting region to the positive pressure. Residual fluid which has accumulated in the sediment collecting region can be squeezed out of the sediment collecting region with the help of the positive pressure.

Advantageously, the pressure applying means comprises a compressor for the production of the positive pressure. The device in accordance with the invention can thereby be operated without any auxiliary external facilities.

It is particularly preferable, if a gaseous auxiliary medium, which is arranged to be supplied to the sediment collecting region for applying the positive pressure thereto, is arranged to be subjected to a pressure by means of the pressure applying means. The gaseous auxiliary medium enables the positive pressure to be transmitted to the sediment collecting region and then into the sediment collecting region in a particularly effective manner. A particularly efficient process for drying the solids is thereby ensured.

It is particularly expedient if the auxiliary medium is formed by air. This makes for particularly secure and efficient operation of the device in accordance with the invention.

It is expedient if the pressure applying means comprises a flow control device with the aid of which the supply of the auxiliary medium to the sediment collecting region is controllable. The quantity of auxiliary medium which is needed for the process of drying a certain amount of solid can thereby be set in a particularly efficient manner.

Preferably, the pressure applying means comprises a supply line for supplying the auxiliary medium to the sediment collecting region. The supply line enables the auxiliary medium to be subjected to pressure even at a spatial distance from the sediment collecting region.

Preferably, the residual fluid is arranged to be displaced from the sediment collecting region by the auxiliary medium. This has the advantage that the gaseous and thus dry auxiliary medium entirely replaces or at least substantially entirely replaces the residual fluid within the sediment collecting region thereby ensuring complete removal or at least substantially complete removal of the residual fluid from the sediment collecting region.

Preferably, the positive pressure to which the sediment collecting region is arranged to be subjected amounts to at least approximately 1.1 bar absolute pressure. A comparatively small pressure difference of approximately 0.1 bar for example relative to an ambient pressure of approximately 1 bar for example is thus sufficient to enable the residual fluid to be removed from the sediment collecting region with the aid of a positive pressure.

In accordance with one embodiment of the invention, the positive pressure amounts to at most approximately 1.4 bar absolute pressure. A pressure applying means of particularly simple construction can therefore be used.

A particularly advantageous embodiment of the invention envisages that the sedimentation device should comprise an evacuating means for subjecting the sediment collecting region to the negative pressure. The evacuating means can be provided as an alternative or in addition to the previously described pressure applying means. If the sedimentation device comprises merely a pressure applying means or just an evacuating means then this enables the device in accordance with the invention to be of particularly simple construction. If the device in accordance with the invention comprises both a pressure applying means and an evacuating means, then the device in accordance with the invention can be operated in a particularly flexible manner.

The evacuating means enables the sediment collecting region to be subjected to negative pressure so that residual fluid can be removed from the sediment collecting region, for example, by evaporating and/or sucking the residual fluid out of the sediment collecting region.

Advantageously, the evacuating means comprises a vacuum pump. The negative pressure can thereby be made available without having to resort to external auxiliary facilities.

It is expedient if the evacuating means comprises a blocking device with the aid of which the sediment collecting region and the evacuating means are selectively connectable to one another or are separable from each other. In this way, the timing period for which the sediment collecting region is subjected to the negative pressure can be controlled in a particularly simple manner.

Preferably, the evacuating means comprises an evacuation line for discharging the residual fluid removed from the sediment collecting region. This enables the residual fluid to be transported away in a particularly simple manner.

It is advantageous, if the residual fluid is evaporable by the application of the negative pressure. This enables the solids deposited in the form of a sediment in the sediment collecting region to be dried in a particularly efficient manner.

In accordance with one embodiment of the invention, the negative pressure amounts to at least approximately 0.005 bar absolute pressure. Evacuating means of comparatively simple construction can thereby be used.

It is expedient if the negative pressure amounts to at most approximately 0.050 bar absolute pressure. This thereby enables the solids in the sediment collecting region to be dried in a particularly efficient manner i.e. completely dried, or fully dried at least insofar as possible.

In accordance with one embodiment of the invention, the sedimentation device comprises a discharging means for discharging the residual fluid removed from the sediment collecting region. The discharging means facilitates the handling and transportation of the residual fluid removed from the sediment collecting region.

Preferably, the discharging means comprises a blocking device with the aid of which the sediment collecting region and the discharging means are selectively connectable to one another or are separable from each other. This enables the residual fluid to be discharged from the sediment collecting region at a desired point in time and for a desired period of time.

It is expedient if the discharging means comprises a discharge line through which residual fluid is arranged to be supplied to a container for the fluid medium that is to be supplied to the reversible flow filter. This has the advantage that the residual fluid removed from the sediment collecting region is made available again in order to enable it to be filtered with the help of the reversible flow filter.

As an alternative or in addition thereto, the discharging means may comprise a discharge line through which residual fluid is arranged to be supplied to a container for the filtrate from the reversible flow filter. This has the advantage that the residual fluid can be made available for further use without any temporal delay due to a renewed filtering process, for example, as a cleansing fluid, as a lubricant and/or as a cooling agent.

A preferred embodiment of the invention envisages that the sedimentation device should comprise a filtering means for filtering the residual fluid removed from the sediment collecting region. With the help of the sedimentation device, filtered residual fluid can thereby be made available, such a fluid thus being particularly well suited for further use as a cleansing fluid as a lubricant and/or as a cooling agent.

Preferably, the filtering means borders on the sediment collecting region. This has the advantage that not only can residual fluid removed from the sediment collecting region be filtered with the help of the filtering means, but in addition, the solids deposited in the form of a sediment in the sediment collecting region can be retained in the sediment collecting region with the help of the filtering means.

Preferably, the filtering means is arranged on a closure element which closes a solid discharge opening of the sedimentation device. This has the advantage that the sedimentation device is of particularly compact construction.

It is expedient if the filtering means comprises a sieve. This enables a robust filtering means to be provided which, moreover, can be thoroughly cleaned.

It is particularly advantageous, if the filtering means is movable between a working position in which the filtering means closes an outlet opening of the sedimentation device, and a rest position in which the filtering means unblocks the outlet opening of the sedimentation device. This has the advantage that the filtering means can filter the residual fluid in its working position and that the filtering means can be thoroughly cleaned in its rest position.

Preferably, the filtering means comprises a moving apparatus for moving the filtering means from the working position into the rest position. This facilitates the handling of the filtering means.

It is particularly preferred that the sedimentation device should comprise a flushing means for flushing the filtering means. This thereby ensures the reliable long-term operation of the filtering means.

In accordance with one embodiment of the invention, the filtering means is arranged to be flushed with a flushing gas. The flushing gas, compressed air for example, has a particularly low viscosity so that the filtering means will be cleaned particularly well when flushing the filtering means with the flushing gas.

The cleaning process can be controlled in a particularly effective manner if the flushing gas supply comprises a flushing gas blocking device.

If the flushing gas supply comprises a flushing gas line, the flushing gas can be stored at a place well removed from the filtering means and can be supplied from there to the filtering means.

A further embodiment of the invention envisages that the flushing means should comprise a flushing liquid supply by means of which the filtering means is arranged to be flushed with a flushing liquid. Flushing the filtering means with a flushing liquid has the advantage that this prevents the filtering means from drying out.

Advantageously, the flushing liquid supply comprises a flushing liquid blocking device in order to enable the supply of the flushing liquid to the filtering means to be controlled in an effective manner.

If the flushing liquid supply comprises a flushing liquid line, the flushing liquid can be made available at a place well removed from the filtering means and can be supplied from there to the filtering means.

Preferably, the sedimentation device comprises a sedimentation container. With the help of the sedimentation container, a volume can be made available in which solids can be separated from the flushed back fluid by a process of sedimentation in the sediment collecting region.

In a preferred embodiment of the invention, the sediment collecting region is formed by a lower region of the sedimentation container when this is in the operational position.

Preferably, the device comprises an aerator by means of which a container volume bounded by the sedimentation container is selectively connectable to an environment of the sedimentation container or the container volume is separable from the environment. The aerator enables ventilation of the sedimentation container to be effected in a particularly simple manner. By separating the container volume from the environment, it is possible to apply pressure to the container volume so that a sediment collecting region possibly formed in the lower region of the sedimentation container is arranged to be subjected to positive pressure.

It is expedient, if the sedimentation device comprises a detecting device for detecting the level of a quantity of the flushed back fluid that is contained in the sedimentation container. With the help of this detecting device for example, it can be determined as to whether the quantity of the flushed back fluid contained in the sedimentation container falls below a certain minimum quantity.

A further embodiment of the invention envisages that the sedimentation device should comprise a quantity of sediment detecting device for detecting the quantity of sediment that has collected within the sediment collecting region. It can thereby be determined for example as to whether a certain minimum quantity of solids has collected in the sediment collecting region so that the process of subjecting the sediment collecting region to the positive pressure and/or the negative pressure for the removal of the residual fluid from the sediment collecting region can be started.

A particularly preferred embodiment of the invention envisages that the sedimentation device should comprise a solid discharge opening for discharging the solid that has deposited in the form of a sediment from the sediment collecting region and a closure element for closing the solid discharge opening. It is thereby possible to achieve a particularly simple process for discharging the solids from the sediment collecting region.

Further features and advantages of the invention form the subject matter of the following description and the pictorial illustration of an exemplary embodiment.

DETAILED DESCRIPTION OF THE INVENTION

Similar or functionally equivalent elements are designated by the same reference symbols in each of the Figures.

Figure 1:
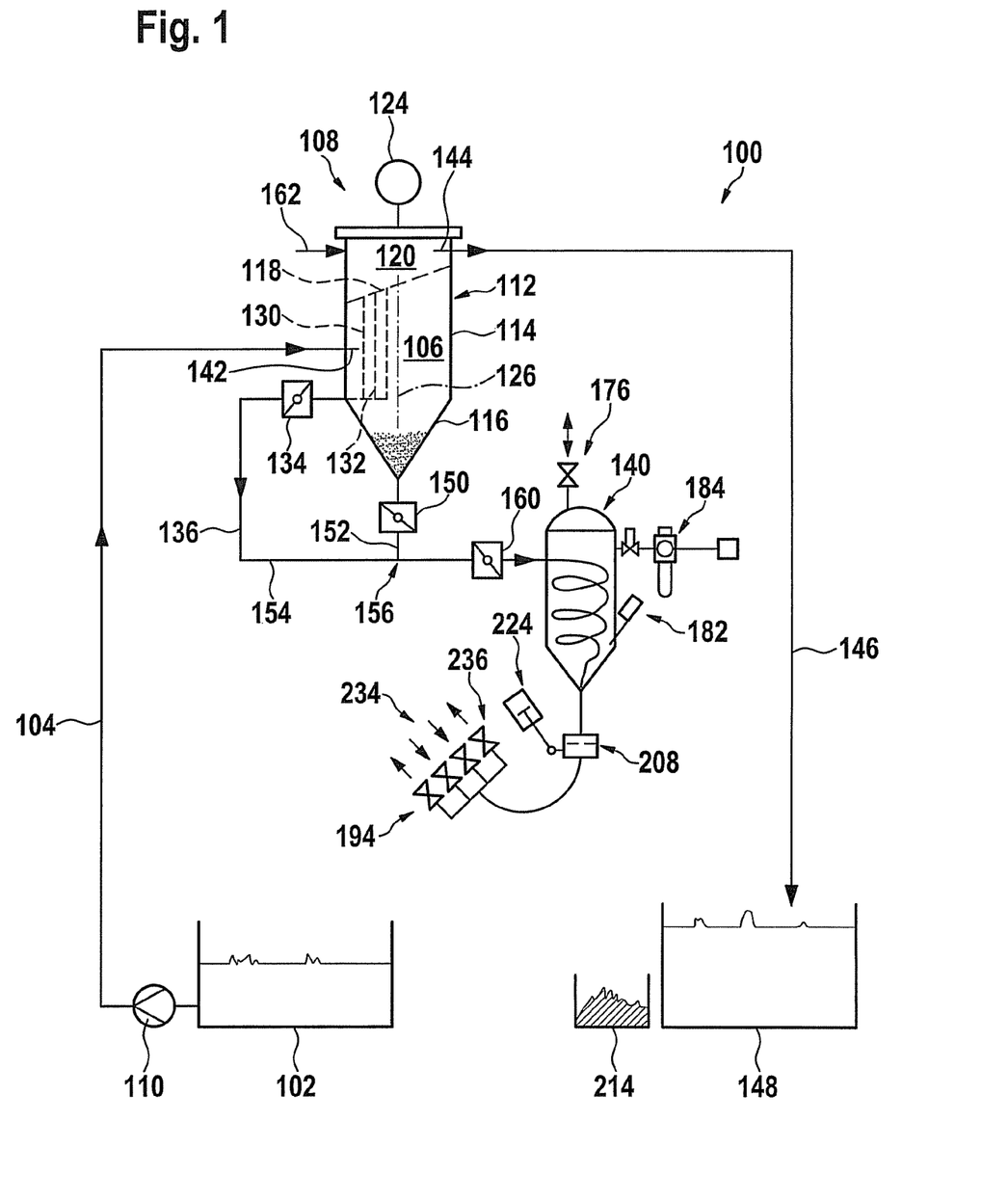
FIG. 1 shows a schematic illustration of a filtering means for the filtration of a fluid medium containing solids.

A filtering means for the filtration of a fluid medium containing solids, an aqueous cleaner, an oil or an emulsion for example, which bears the general reference 100 and is illustrated in FIG. 1 comprises a dirt tank 102 for receiving the medium requiring filtering which is connected to the dirt-side space 106 of a reversible flow filter 108 by means of a filter supply line 104. As a supplement to the following explanation, reference is hereby expressly made to DE 20 2006 003 680 U1 from the same applicant in regard to the structure and the mode of functioning of the reversible flow filter 108.

A filter pump 110 for advancing the medium requiring filtering from the dirt tank 102 to the reversible flow filter 108 is arranged in the filter supply line 104.

The reversible flow filter 108 comprises a filter housing 112 having a substantially cylindrical upper section 114 and a downwardly tapering lower conical section 116 adjoined to the lower part of the upper section 114.

The upper section 114 of the filter housing 112 is divided by a partition wall 118 which is indicated by a broken line in FIG. 1 into a filtrate-side space 120 that is located above the partition wall 118 and the dirt-side space 106 which is located below the partition wall 118, whereby the interior of the lower section 116 of the filter housing 112 also counts as part of the dirt-side space 106 of the reversible flow filter 108.

Furthermore, a (not illustrated) filter cartridge is arranged in the filter housing 112, said cartridge being rotatable about a vertical axis of rotation 126 by means of a motor 124 and it contains a plurality (not illustrated) of filter elements which are movable successively into a filter chamber 130 of the reversible flow filter 108 indicated by the broken lines by rotation of the filter cartridge about the axis of rotation 126.

On the filtrate-side, each of the filter chamber elements located in the filter chamber 130 is connected on the one hand to the filtrate-side space 120 of the filter housing 112 and on the other hand to a back flushing line 132 which leads from the filter chamber 130 to a back flushing valve 134. Furthermore, the back flushing valve 134 is connected to a flushing line 136 which leads from the reversible flow filter 108 to a fluid inlet 138 (see FIG. 2) of a sedimentation container 140.

A dirt-side inlet 142 of the reversible flow filter 108 which opens out into the dirt-side space 106 of the filter housing 112 is connected to the filter supply line 104.

A filtrate-side return outlet 144 of the reversible flow filter 108 which emerges from the filtrate-side space 120 of the filter housing 112 is connected by means of a filter return line 146 (see FIG. 1) to a clean tank 148 for receiving the filtered medium.

Furthermore, a compressed air supply 162 which is connected to a (not illustrated) source of compressed air opens out into the filtrate-side space 120 of the filter housing 112.

The conically converging lower section 116 of the filter housing 112 is arranged to be closed at its lower end by means of a coarse dirt valve 150.

Furthermore, the coarse dirt valve 150 is connected by a vertically running coarse dirt line 152 to the flushing line 136, whereby the lower end of the coarse dirt line 152 serving as a coarse dirt outlet merges into a substantially horizontally running section of the flushing line 136 so that a coarse dirt collecting space 156 is formed within the flushing line 136 in the vicinity of the point of entry of the coarse dirt line 152.

A (not illustrated) metal sensor is arranged on the coarse dirt line 152 for the purposes of detecting the level to which the coarse dirt fills the coarse dirt line 152. As a supplement to the preceding explanation, reference is hereby expressly made to DE 20 2006 003 680 U1 from the same applicant in regard to the arrangement and the mode of functioning of the metal sensor as well as in regard to the design of the coarse dirt collecting space 156 and its environment.

A reverse flushing discharge valve 160 is arranged in the flushing line 136 downstream of the coarse dirt collecting space 156, said valve being arranged to block access to the sedimentation container 140 illustrated in detail in FIGS. 2 to 8.

Figure 2:
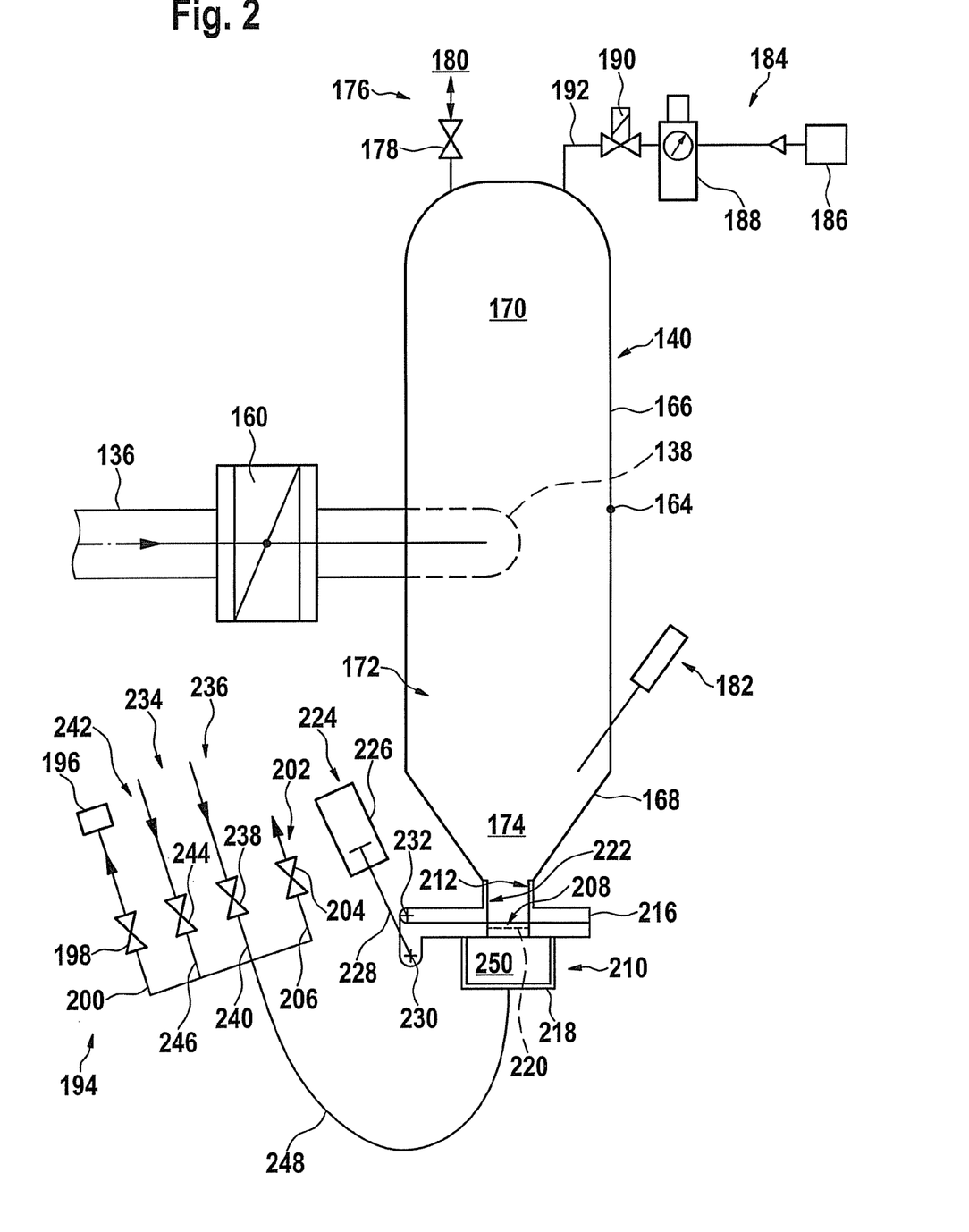
FIG. 2 a schematic partly sectional side view of a sedimentation device of the filtering means in FIG. 1 in the initial state of the sedimentation device.

The sedimentation container 140 comprises a container housing 164 having a substantially cylindrical upper section 166 and a downwardly tapering lower conical section 168 adjoined to the lower part of the upper section 166.

The flushing line 136 flows into the upper section 166 of the container housing 164 via the fluid inlet 138.

The container housing 164 bounds a container volume 170. The sedimentation container 140 has a lower region 172 which comprises a sediment collecting region 174.

The sedimentation device illustrated in detail in FIG. 2 comprises an aerator 176 having a ventilation valve 178. The container volume 170 bounded by the sedimentation container 140 can be connected to an environment 180 of the sedimentation container 140 or be separated from the environment 180 by switching over the ventilation valve 178.

Furthermore, the sedimentation device illustrated in FIG. 2 comprises a detecting device 182 for detecting the level to which a quantity of the fluid flushed back from the reversible flow filter 108 fills the sedimentation container 140.

A pressure applying means 184 is provided in order to enable the sediment collecting region 174 to be subjected to pressure. This comprises a compressor 186 which compresses air from the environment. Furthermore, the pressure applying means 184 comprises a pressure measuring unit 188 for measuring the pressure produced by the compressor 186 and also a flow control device 190 with the aid of which the supply of compressed air to the sediment collecting region 174 is controllable. Furthermore, the pressure applying means 184 comprises a supply line 192 which flows into the container volume 170 of the sedimentation container 140.

Furthermore, the sedimentation device illustrated in FIG. 2 comprises an evacuating means 194 incorporating a vacuum pump 196 for the production of a vacuum. Furthermore, the evacuating means 194 comprises a blocking device 198 as well as an evacuation line 200. The sediment collecting region 174 can be subjected to a negative pressure with the help of the evacuating means 194.

Furthermore, the sedimentation device comprises a discharging means 202 incorporating a blocking device 204 as well as a discharge line 206. Residual fluid can be discharged from the sediment collecting region 174 with the help of the discharging means 202.

A filtering means 208 is provided for filtering the residual fluid removed from the sediment collecting region 174. This said filter adjoins the lower part of the sediment collecting region 174. The filtering means 208 is arranged on a closure element 210 which closes a solid discharge opening 212 of the sedimentation container 140. Solids that have deposited in the form of a sediment in the sediment collecting region 174 can be discharged through the solid discharge opening 212 and supplied to a solid collecting container 214 which is illustrated in FIG. 1 and in FIGS. 6 and 7.

The closure element 210 comprises an upper cover part 216 as well as a cup-shaped base part 218 which is connected thereto. The base part 218 serves to accommodate a sieve 220. The sieve 220 bounds an outlet opening 222 through which residual fluid can be discharged from the sediment collecting region 174 and supplied to the sieve 220.

The filtering means 208 comprises a moving apparatus 224 having a linear drive 226. The linear drive 226 comprises a displaceable piston rod 228 which is connected in rotational manner at the free end thereof to the base part 218 of the closure element 210 by means of a joint 230. The base part 218 of the closure element 210 is mounted on a static pivotal bearing 232 which is arranged on the cover part 216 of the closure element 210 and is rotatable about this pivotal bearing 232 (see FIG. 6).

Furthermore, as can be seen from FIG. 2, the sedimentation device comprises in addition a flushing means 234 for flushing the filtering means 208. The flushing means 234 comprises a flushing gas supply 236 incorporating a flushing gas blocking device 238 and a flushing gas line 240.

Furthermore, the flushing means 234 comprises a flushing liquid supply 242 incorporating a flushing liquid blocking device 244 and a flushing liquid line 246.

The evacuation line 200, the discharge line 206, the flushing gas line 240 and the flushing liquid line 246 are connected via a common line 248 to a chamber 250 that is bounded by the base part 218 of the closure element 210.

In an alternative, not illustrated embodiment of the sedimentation device, at least two of the lines 200, 206, 240 and 246 are connected directly to the chamber 250, i.e. without the intermediary of a common line 248.

The previously described filtering means 100 functions as follows:

The fluid medium mixed with solids requiring filtering, for example an aqueous cleansing fluid, an oil or an emulsion is collected in the dirt tank 102.

From the dirt tank 102, the medium requiring filtering is supplied to the dirt-side space 106 of the reversible flow filter 108 by the filter pump 110.

The inlet 142 of the reversible flow filter 108 runs substantially tangentially to the inner boundary wall of the filter housing 112 so that the medium requiring filtering moves through the interior of the filter housing 112 along a helical track.

Upon entry of the medium requiring filtering into the reversible flow filter 108, heavy dirt particles sink downwardly through the opened coarse dirt valve 150 and the coarse dirt line 152 into the coarse dirt collecting space 156 in the flushing line 136 where an accumulation of coarse dirt consequently forms during the filtering phase of the reversible flow filter 108.

During this filtering phase of the reversible flow filter 108, the back flushing valve 134 and the reverse flushing discharge valve 160 are closed.

The medium requiring filtering is supplied from the dirt-side space 106 of the reversible flow filter 108 through the filter element in the filter chamber 130 to the filtrate-side space 120 of the reversible flow filter 108.

From the filtrate-side space 120 of the reversible flow filter 108, the filtrate then reaches the clean tank 148 via the filter return line 146.

During the passage through the filter element, the finer solid particles are held back between the dirt side and the clean side of the filter element in accord with the filtration rate of the filter element.

When the maximum dirt retention capacity of the filter element is reached, a back flushing phase of the reversible flow filter 108 is initiated for the purposes of regenerating the filter element, i.e. a compressed-air-supported reverse flushing of the filtering medium is effected from the clean side to the dirt side.

For the purposes of this back flushing process, the coarse dirt valve 150 is closed, and the reverse flushing discharge valve 160 in the flushing line 136 is opened.

Subsequently, the back flushing valve 134 is opened for a brief period, and the filtrate-side space 120 of the reversible flow filter 108 is subjected to compressed air by means of the compressed air supply 162 so that filtrate is flushed out with the support of the compressed air from the filtrate-side space 120 of the reversible flow filter 108 through the filtering medium of the filter element 128 back into the dirt-side space 106 of the reversible flow filter 108, from there, into the back flushing line 132 and from there, through the opened back flushing valve 134 into the flushing line 136.

The impurities detached during the reverse flushing of the filter element 128 also enter the flushing line 136 together with the filtrate being used as a flushing medium.

The flushed back fluid also passes through the coarse dirt collecting space 156 and rinses the coarse dirt accumulated there through the opened reverse flushing discharge valve 160 into the sedimentation container 140. (see FIG. 3).

The reverse flushing discharge valve 160 is opened during each back flushing phase for a period of approximately 1 sec to 3 sec for example.

The back flushing phase of the reversible flow filter 108 is terminated by the closure of the back flushing valve 134 and the reverse flushing discharge valve 160 as well as by the renewed opening of the coarse dirt valve 150, whereupon a new filtering phase of the reversible flow filter 108 begins.

The back flushing phase of the reversible flow filter 108 can be initiated when a given maximum level of the coarse dirt in the coarse dirt line 152 is detected by means of the metal sensor on the coarse dirt line 152.

As an alternative or in addition thereto, a back flushing phase of the reversible flow filter 108 can be initiated when the difference in pressure between the dirt side and the clean side of the filter element exceeds a given maximum value.

The treatment of the fluid flushed back in the course of the back flushing phase takes place in the sedimentation container 140 illustrated in FIGS. 2 to 8.

Figure 3:
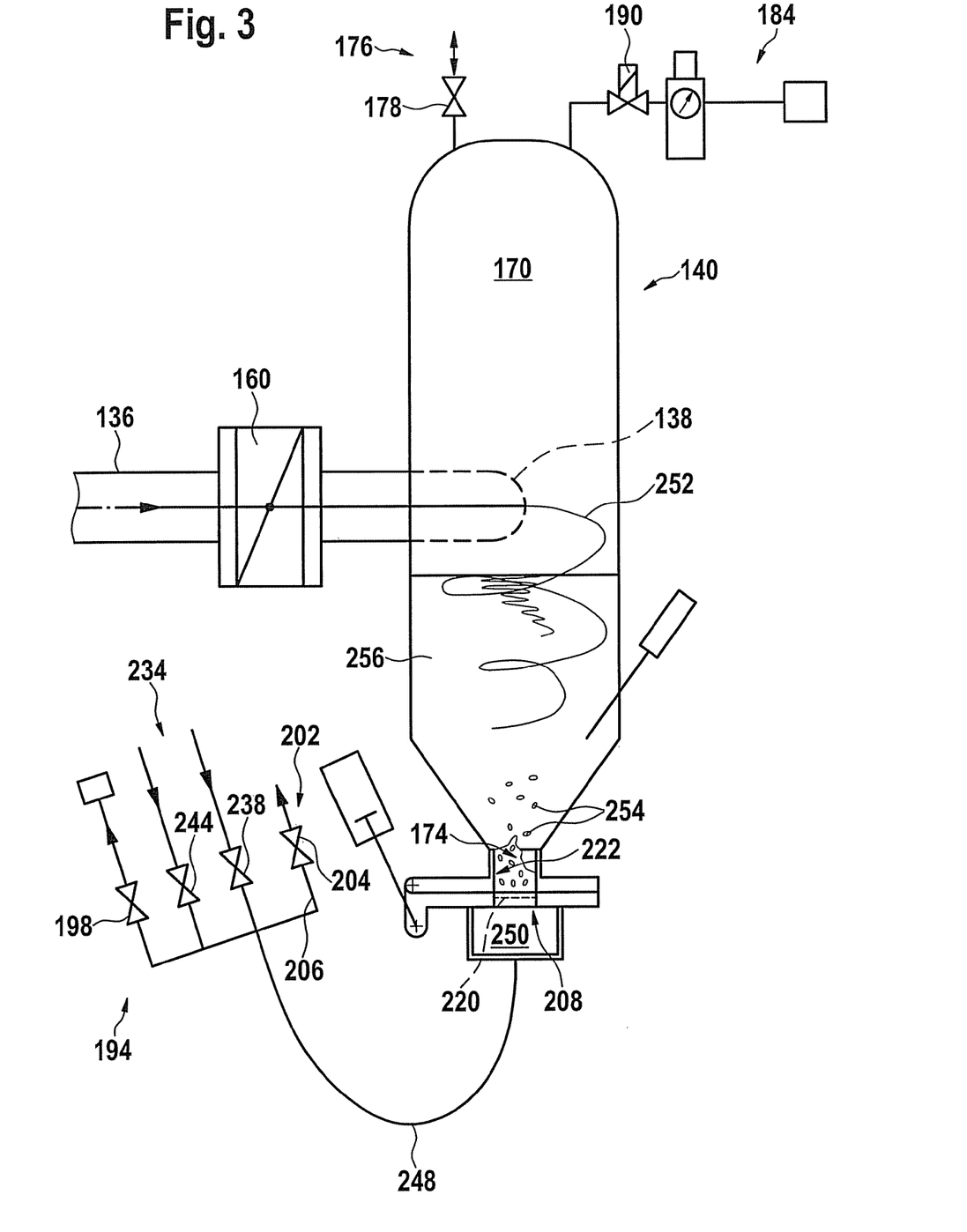
FIG. 3 an illustration of the sedimentation device corresponding to FIG. 2 in a back flushing phase of the filtering means.

As can be seen from FIG. 3, the fluid inlet 138 is aligned substantially tangentially relative to the inner wall of the container housing 164 so that the flushed back fluid enters the interior of the sedimentation container 140 along a helical track 252.

The solids (coarse dirt and the impurities flushed back from the filter element), which are contained in the flushed back fluid and bear the reference symbol 254 in FIG. 3 and which are within the flushed back fluid bearing the reference symbol 256 in FIG. 3, are deposited in the form of a sediment in the sedimentation container 140 and settle in the sediment collecting region 174.

The ventilation valve 178 of the aerator 176 is opened during the back flushing phase illustrated in FIG. 3. The flow control device 190 of the pressure applying means 184 is closed. Furthermore, the blocking device 198 of the evacuating means 194, the blocking device 204 of the discharging means 202 as well as the flushing gas blocking device 238 and the flushing liquid blocking device 244 of the flushing means 234 are closed.

At the conclusion of the back flushing phase, the reverse flushing discharge valve 160 and the ventilation valve 178 are closed. From then on, the sediment collecting region 174 can be subjected to pressure. This application of pressure phase is described hereinafter with reference to FIG. 4.

Figure 4:
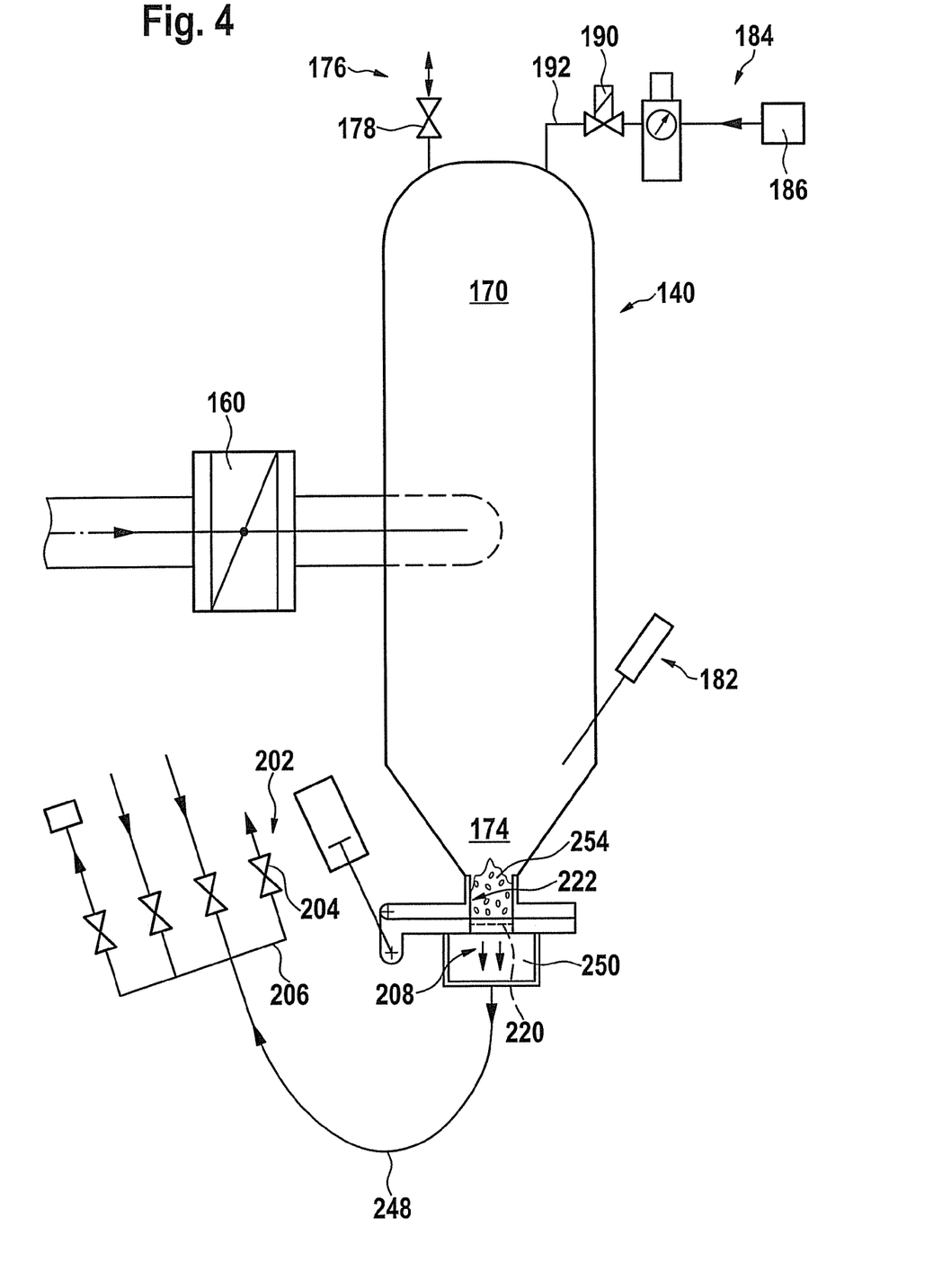
FIG. 4 an illustration of the sedimentation device corresponding to FIG. 3 in a pressure applying phase of the sedimentation device.

The blocking device 204 of the discharging means 202 is opened for the purposes of initiating the application of pressure phase. At the same time, the flow control device 190 of the pressure applying means 184 is opened. In consequence, compressed air that is effective as an auxiliary medium and is produced with the help of the compressor 186 is fed via the supply line 192 into the container volume 170 of the sedimentation container 140. The absolute pressure of the compressed air being introduced can amount to between approximately 1.1 bar and 1.4 bar.

Due to the process of applying pressure in the form of compressed air to the fluid 256 that is illustrated in FIG. 3, the fluid 256 is squeezed out of the container volume 170 and out of the sediment collecting region 174 and is supplied by way of the outlet opening 222 to the filtering means 208. Hereby, the quantity of compressed air introduced into the sediment collecting region 174 displaces the residual fluid adhering to the solids 254. The residual fluid is filtered with the help of the sieve 220 of the filtering means 208 and enters the discharge line 206 via the chamber 250 and the common line 248 and from there, reaches the dirt tank 102 or the clean tank 148 via the opened blocking device 204.

The application of pressure phase described above can be monitored with the help of the detecting device 182. This phase is concluded when the detecting device 182 can no longer detect liquid in the sedimentation container 140 or if the detecting device 182 can no longer detect liquid and it is terminated after the elapse of a certain period of time (drying time) commencing from this time point.

At the conclusion of the application of pressure phase, the blocking device 204 and the flow control device 190 are closed, and the ventilation valve 178 is opened.

The sediment collecting region 174 could also be subjected to a negative pressure. This is described hereinafter with reference to FIG. 5. For the purposes of initiating the evacuation phase, the ventilation valve 178 is closed. Subsequently, the blocking device 198 of the evacuating means 194 is opened.

Figure 5:
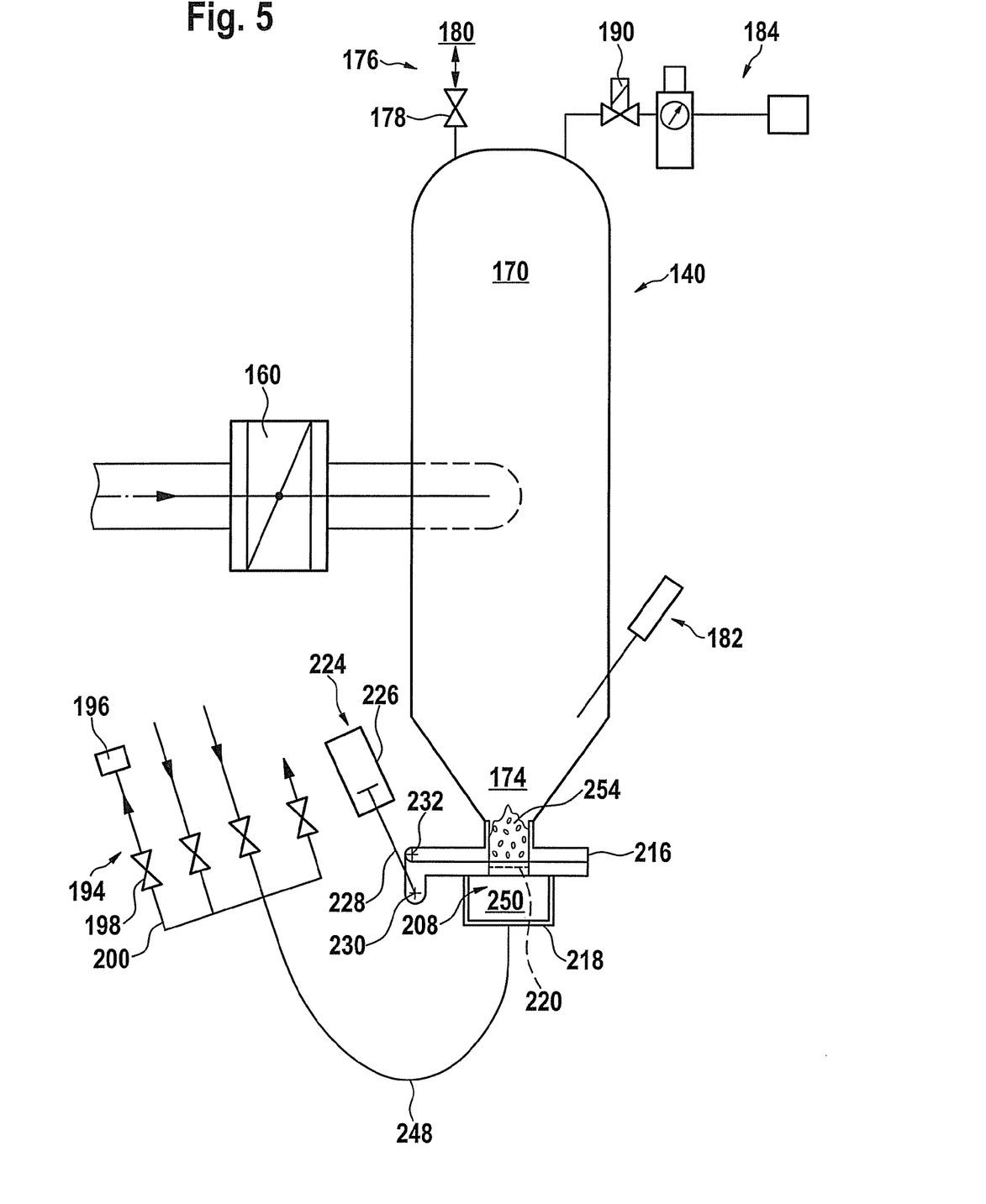
FIG. 5 an illustration of the sedimentation device corresponding to FIG. 4 in an evacuation phase of the sedimentation device.

A vacuum can then be produced with the help of the vacuum pump 196. The vacuum pump 196 is in contact with the sediment collecting region 174 via the opened blocking device 198, the evacuation line 200 as well as the common line 248 and via the chamber 250 and the openings (without reference symbols) in the sieve 220. In this way, a vacuum is produced within the sediment collecting region 174 so that the sediment collecting region is subjected to a negative pressure. The absolute pressure of the negative pressure can amount to between approximately 0.005 bar and approximately 0.050 bar.

By subjecting the sediment collecting region 174 to the negative pressure, any residual fluid present in this region and which may be adhering to the solids 254 for example will evaporate. The residual fluid is thereby removed from the sediment collecting region 174. The length of time for which the sediment collecting region 174 is subjected to negative pressure is variable and, in particular, can be adjusted in accord with the quantity of residual fluid that is to be removed and/or the quantity of solids that is to be dried.

After the abovementioned absolute pressures have been reached and a certain time has elapsed, the blocking device 198 is closed for the purposes of concluding the evacuation phase. Subsequently, the ventilation valve 178 is opened so that the pressure prevailing in the container volume 170 and in the sediment collecting region 174 will correspond to the pressure in the environment 180 of the sedimentation container 140.

In order to remove residual fluid from the sediment collecting region 174, it can be sufficient for just the application of pressure phase that was previously described with reference to FIG. 4 to be gone through. It may likewise be sufficient for merely the evacuation phase that was previously described with reference to FIG. 5 to be gone through. However, a particularly effective process for drying the solids 254 that have deposited in the form of a sediment in the sediment collecting region 174 is obtained if both the application of pressure phase and the evacuation phase are executed. Preferably thereby, the evacuation phase is performed after the application of pressure phase.

Figure 6:
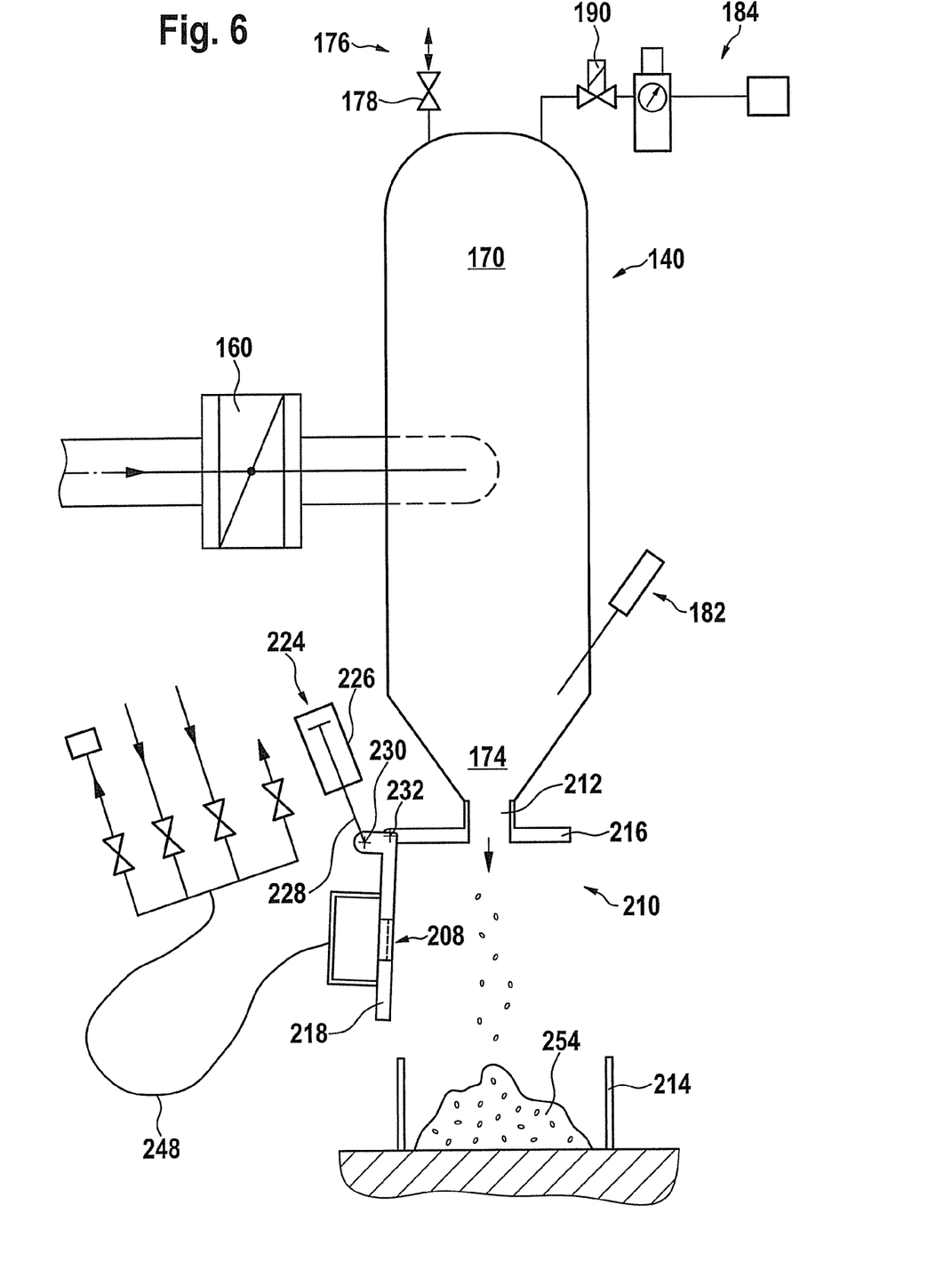
FIG. 6 an illustration of the sedimentation device corresponding to FIG. 5 in a solid discharge phase of the sedimentation device.

In order to remove dried solid 254 from the sediment collecting region 174, the filtering means 208 can be moved from the working position thereof that is illustrated in FIG. 5 into a rest position which is illustrated in FIG. 6 after ventilating the sedimentation container 140 by opening the ventilation valve 178. To this end, the moving apparatus 224 is controlled in such a way that the piston rod 228 of the linear drive 226 moves the joint 230 so that the base part 218 of the closure element 210 pivots relative to the cover part 216 about the fixed articulated bearing 232. The solid discharge opening 212 is thereby unblocked so that dried solid 254 falls under the effect of the force of gravity from the sediment collecting region 174 into the solid collecting container 214.

The filtering means 208 can be cleaned by flushing. A cleaning process using a flushing gas is described hereinafter with reference to FIG. 7.

Figure 7:
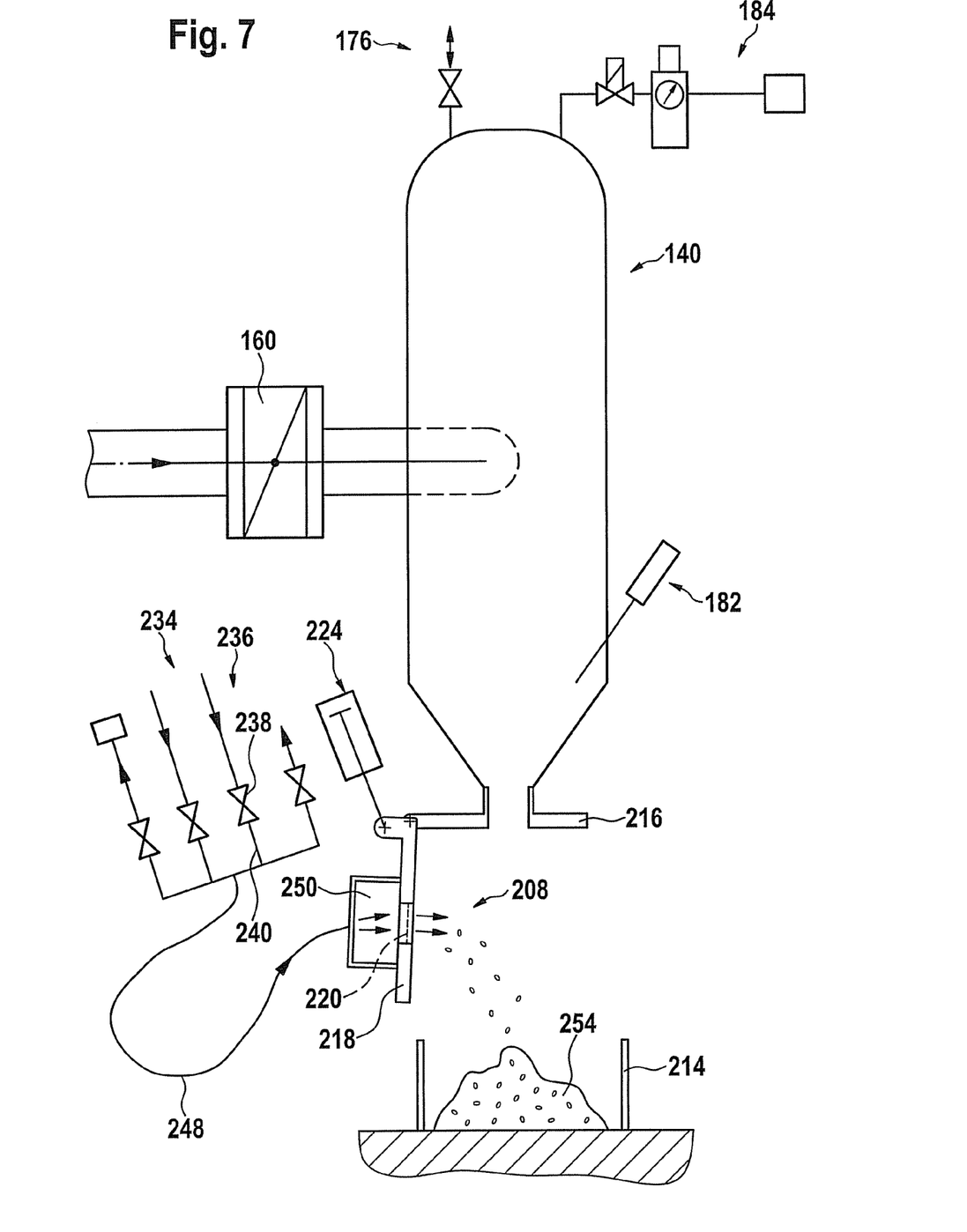
FIG. 7 an illustration of the sedimentation device corresponding to FIG. 6 in a first flushing phase of the sedimentation device.

The process of cleaning the filtering means 208 with a flushing gas, preferably compressed air, is particularly simple if the filtering means 208 adopts its rest position illustrated in FIG. 7. For the purposes of initiating the flushing process, the flushing gas blocking device 238 is opened so that a flushing gas that is made available from a not illustrated source of flushing gas can be supplied to the back of the sieve 220 via the flushing gas line 240, via the common line 248 and via the chamber 250.

The cleaning of the sieve 220 takes place mechanically i.e. in that the stream of flushing gas removes solids 254 adhering to the sieve 220. The solids 254 removed from the sieve 220 fall into the solid collecting container 214. The flushing gas blocking device 238 is closed after a blowing period which is adjustable as necessary. Subsequently, the filtering means is brought back into the working position thereof with the help of the moving apparatus 224, see FIG. 8.

The filtering means 208 can also be cleaned with the help of a flushing liquid 258. This is described with reference to FIG. 8.

Figure 8:
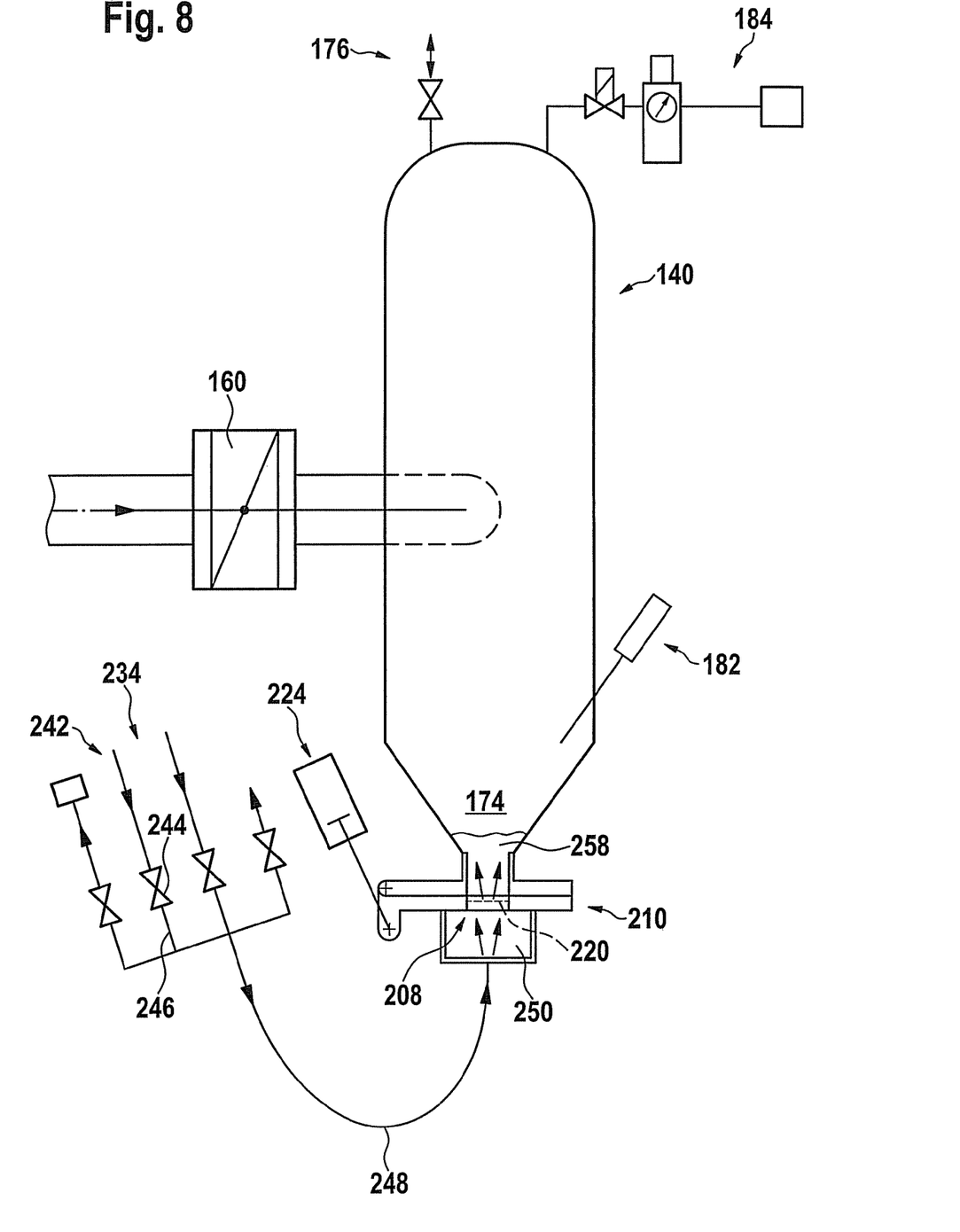
FIG. 8 an illustration of the sedimentation device corresponding to FIG. 7 in a second flushing phase of the sedimentation device.

In order to rinse the filtering means 208 with flushing liquid 258, the flushing liquid blocking device 244 is opened so that flushing liquid made available from a not illustrated source of flushing liquid can be fed into the chamber 250 with the help of the flushing liquid line 246 and the common line 248. From there, the flushing liquid 258 passes through the openings in the sieve 220 of the filtering means 208 and into the sediment collecting region 174. The sieve 220 is thereby cleaned. In order to prevent the sieve 220 from drying out or the sieve 220 from becoming clogged with solids 254, provision can be made for the flushing liquid 258 to remain in the sedimentation container 140.

The invention claimed is:

1. A device for treating a fluid containing solids that has been flushed back from a reversible flow filter, comprising a sedimentation device for separating solids from the flushed back fluid by a process of sedimentation in a sediment collecting region, wherein the sediment collecting region is arranged to be subjected to a positive pressure and/or a negative pressure in order to remove residual fluid from the sediment collecting region, wherein the sedimentation device comprises a filter means arranged on a closure element for filtering the residual fluid removed from the sediment collecting region and wherein the closure element is moveable between a working position in which the closure element closes an outlet opening of the sedimentation device, and a rest position in which the closure element unblocks the outlet opening of the sedimentation device, the closure element being connected to the sedimentation device in both the working and rest positions.

2. A device in accordance with claim 1, wherein the sedimentation device comprises a pressure applying device for subjecting the sediment collecting region to the positive pressure.

3. A device in accordance with claim 2, wherein the pressure applying device comprises a compressor for the production of the positive pressure.

4. A device in accordance with claim 2, wherein a gaseous auxiliary medium, which is arranged to be supplied to the sediment collecting region for applying the positive pressure thereto, is arranged to be subjected to a pressure by means of the pressure applying device.

5. A device in accordance with claim 4, wherein the auxiliary medium is formed by air.

6. A device in accordance with claim 4, wherein the pressure applying device comprises a flow control device with the aid of which the supply of the auxiliary medium to the sediment collecting region is controllable.

7. A device in accordance with claim 4, wherein the pressure applying device comprises a supply line for supplying the auxiliary medium to the sediment collecting region.

8. A device in accordance with claim 4, wherein the residual fluid is arranged to be displaced from the sediment collecting region by the auxiliary medium.

9. A device in accordance with claim 1, wherein the positive pressure amounts to at least approximately 1.1 bar absolute pressure.

10. A device in accordance with claim 1, wherein the positive pressure amounts to at most approximately 1.4 bar absolute pressure.

11. A device in accordance with claim 1, wherein the sedimentation device comprises an evacuating device for subjecting the sediment collecting region to the negative pressure.

12. A device in accordance with claim 11, wherein the evacuating device comprises a vacuum pump.

13. A device in accordance with claim 11, wherein the evacuating device comprises a blocking device with the aid of which the sediment collecting region and the evacuating device are selectively connectable to one another or are separable from each other.

14. A device in accordance with claim 11, wherein the evacuating device comprises an evacuation line for discharging the residual fluid removed from the sediment collecting region.

15. A device in accordance with claim 1, wherein the residual fluid is arranged to be evaporated by the application of the negative pressure.

16. A device in accordance with claim 1, wherein the negative pressure amounts to at least approximately 0.005 bar absolute pressure.

17. A device in accordance with claim 1, wherein the negative pressure amounts to at most approximately 0.050 bar absolute pressure.

18. A device in accordance with claim 1, wherein the sedimentation device comprises a discharge line for discharging the residual fluid removed from the sediment collecting region.

19. A device in accordance with claim 18, wherein the discharge line comprises a blocking device with the aid of which the sediment collecting region and the discharge line are selectively connectable to one another or are separable from each other.

20. A device in accordance with claim 18, wherein the discharge line is configured to supply residual fluid to a container for the fluid medium that is to be supplied to the reversible flow filter.

21. A device in accordance with claim 18, wherein the discharge line is configured to supply residual fluid to a container for the filtrate from the reversible flow filter.

22. A device in accordance with claim 21, wherein the filter means adjoins the sediment collecting region.

23. A device in accordance with claim 21, wherein the filter means comprises a sieve.

24. A device in accordance with claim 21, wherein the filter means comprises a moving apparatus for moving the closure element from the working position into the rest position.

25. A device in accordance with claim 21, wherein the sedimentation device comprises a flushing means for flushing the filter means.

26. A device in accordance with claim 25, wherein the flushing means comprises a flushing gas supply by means of which the filter means is arranged to be flushed with a flushing gas.

27. A device in accordance with claim 26, wherein the flushing gas supply comprises a flushing gas blocking device.

28. A device in accordance with claim 26, wherein the flushing gas supply comprises a flushing gas line.

29. A device in accordance with claim 25, wherein the flushing means comprises a flushing liquid supply by means of which the filter means is arranged to be flushed with flushing liquid.

30. A device in accordance with claim 29, wherein the flushing liquid supply comprises a flushing liquid blocking device.

31. A device in accordance with claim 29, wherein the flushing liquid supply comprises a flushing liquid line.

32. A device in accordance with claim 1, wherein the sedimentation device comprises a sedimentation container.

33. A device in accordance with claim 32, wherein the sediment collecting region is formed by a lower region of the sedimentation container when this is in the operational position.

34. A device in accordance with claim 32, wherein the device comprises an aerator by means of which a container volume bounded by the sedimentation container is selectively connectable to the environment around the sedimentation container or the container volume is separable from the environment.

35. A device in accordance with claim 32, wherein the sedimentation device comprises a detecting device for detecting the level of a quantity of the flushed back fluid that is contained in the sedimentation container.

36. A device in accordance with claim 1, wherein the sedimentation device comprises a quantity of sediment detecting device for detecting the quantity of sediment that has collected in the sediment collecting region.

37. A device in accordance with claim 1, wherein the sedimentation device comprises a solid discharge opening for discharging the solid that has deposited in the form of a sediment from the sediment collecting region and a closure element for closing the solid discharge opening.

* * * * *